(12) United States Patent
Manoogian

(10) Patent No.: US 8,689,834 B2
(45) Date of Patent: Apr. 8, 2014

(54) SYSTEM AND METHOD FOR CAPPING A HIGH PRESSURE LINE

(76) Inventor: Vrej Manoogian, Mt. Dora, FL (US)

(*) Notice: Subject to any disclaimer, the term of this patent is extended or adjusted under 35 U.S.C. 154(b) by 248 days.

(21) Appl. No.: 13/165,327

(22) Filed: Jun. 21, 2011

(65) Prior Publication Data

US 2011/0308656 A1 Dec. 22, 2011

Related U.S. Application Data

(60) Provisional application No. 61/357,221, filed on Jun. 22, 2010.

(51) Int. Cl.
*F16L 55/18* (2006.01)

(52) U.S. Cl.
USPC .............. 138/93; 138/97; 166/181; 166/192

(58) Field of Classification Search
USPC .......... 138/93, 97–99, 89; 166/135, 179, 181, 166/182, 192
See application file for complete search history.

(56) References Cited

U.S. PATENT DOCUMENTS

| | | | | |
|---|---|---|---|---|
| 2,588,188 A | * | 3/1952 | Weisman | 138/89 |
| 2,621,744 A | * | 12/1952 | Toelke | 166/63 |
| 2,930,396 A | * | 3/1960 | Weisman et al. | 137/357 |
| 4,572,228 A | * | 2/1986 | Larson et al. | 137/15.11 |
| 5,628,345 A | * | 5/1997 | Fisco | 138/98 |
| 5,687,771 A | * | 11/1997 | Clough | 138/89 |
| 6,068,725 A | * | 5/2000 | Tweedie et al. | 156/287 |
| 6,543,486 B1 | * | 4/2003 | Morris | 138/93 |
| 7,216,674 B2 | * | 5/2007 | Manners | 138/98 |
| 7,520,301 B2 | * | 4/2009 | Ord et al. | 138/93 |
| 2009/0199922 A1 | * | 8/2009 | Borland | 138/93 |

* cited by examiner

*Primary Examiner* — J. Casimer Jacyna
(74) *Attorney, Agent, or Firm* — Daniel Law Offices, P.A.; Jason T. Daniel, Esq

(57) ABSTRACT

An expandable cap system includes a guide line having a pump at one end and an expandable cap device at the other end. The guide line acts to supply a material capable of creating a plug at one end of the damaged pipe thereby preventing oil or other line contents from entering the pipe at the source.

13 Claims, 10 Drawing Sheets

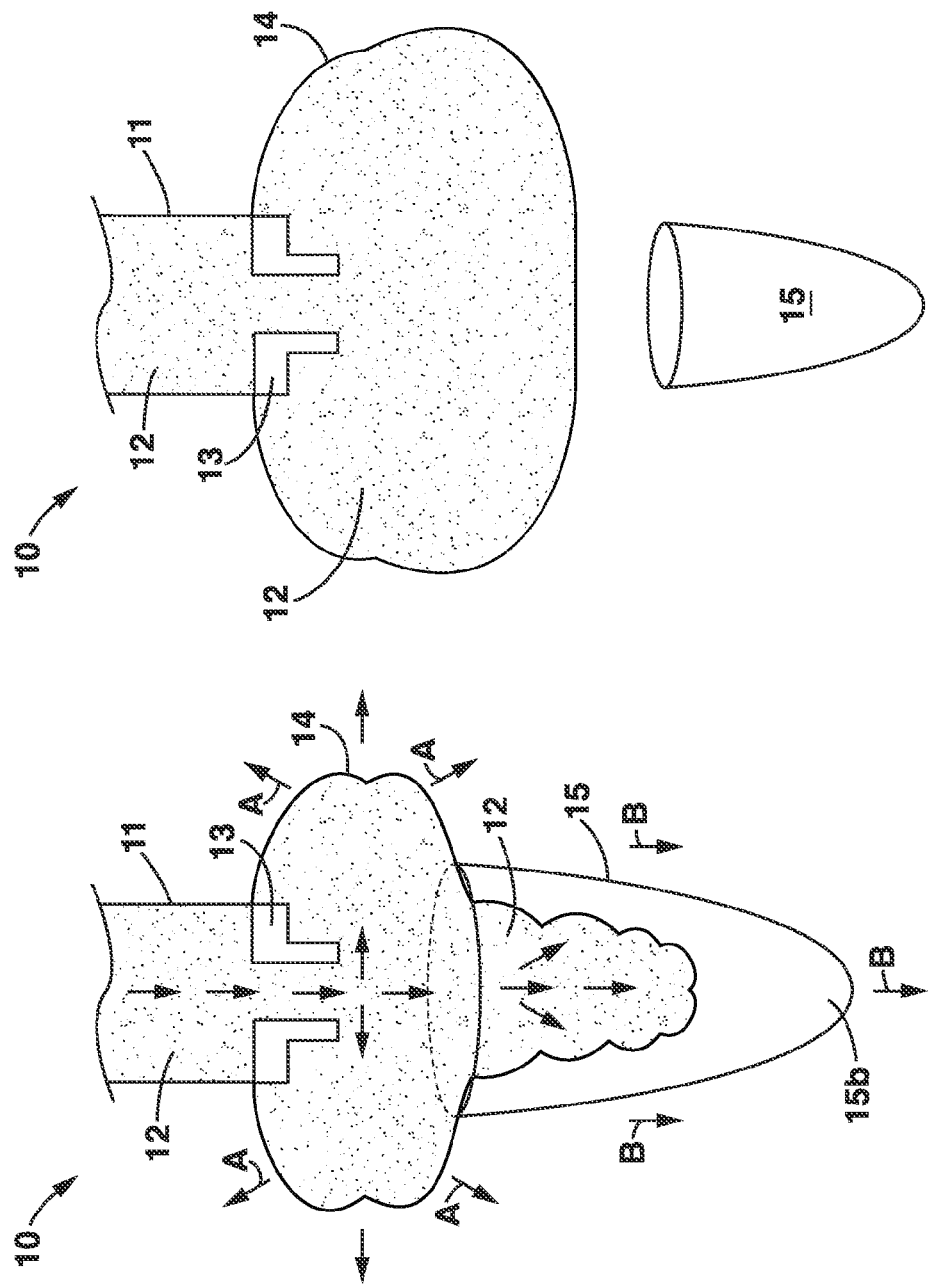

- Identify Pipe Location
  805

- Prepare rupture point
  810

- Insert cap device into rupture point
  815

- Feed line into cable until reaching pipe content source
  820

- Provide supply material to the pump
  825

- Pump material through supply line
  830

- Create a cap/blockage at pipe source location
  835

- Retrieve supply line
  840

- End

SYSTEM AND METHOD FOR CAPPING A
HIGH PRESSURE LINE

CROSS-REFERENCE TO RELATED APPLICATIONS

This application claims the benefit of U.S. application Ser. No. 61/357,221 filed on 22 Jun. 2010, the contents of which are incorporated herein by reference.

BACKGROUND

1. Field of the Invention

The present invention relates generally to methods and systems for line repair, and more particularly to a system and method for preventing the flow of material through a high pressure line.

When a pressurized pipe ruptures and the supply of contents through the pipe can not be easily or quickly stopped, it becomes necessary to prevent the contents of the pipe from being released into the environment. Such a procedure is typically referred to as "capping" the pipe. With specific regard to underground drilling, the most common means for capping a pipe is to install a plug or dome at the rupture point of the pipe itself, in order to stop the contents of the pipe from escaping into the surrounding environment. However, when working with extreme pressures, such as an oil line used for deep sea drilling and excavation, the pressure of the oil escaping from the narrow confines of a ruptured pipe may be too great for conventional capping techniques.

The present invention, directed to a system and method for capping a high pressure line differs from the conventional art in a number of aspects. The manner by which will become more apparent in the description which follows, particularly when read in conjunction with the accompanying drawings.

SUMMARY OF THE INVENTION

It is an object of the invention to provide a system configured to cap a high pressure line by positioning an expandable bladder at a source of the high pressure line contents.

It is another object of the invention to provide a system configured to cap a high pressure line by depositing a self expanding material into the source of the high pressure line contents.

In is yet another object of the invention to provide a method for capping a high pressure line utilizing the systems described above.

Accordingly, there is provided an expandable cap system that includes a guide line having a pump at one end and an expandable cap device at the other end. The guide line can supply a material capable of creating a plug at one end of the damaged pipe thereby preventing oil or other line contents from entering the pipe at the source.

BRIEF DESCRIPTION OF THE DRAWINGS

Presently preferred embodiments are shown in the drawings. It should be appreciated, however, that the invention is not limited to the precise arrangements and instrumentalities shown.

FIG. 3B is a front view of the capping device for use in the system in operation, according to one embodiment of the present invention.

FIG. 3C is another front view of the capping device for use in the system in operation, according to one embodiment of the present invention.

FIG. 8 is a flow chart illustrating a method of preventing the flow of material through a high pressure line utilizing an expandable cap system.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although the below illustrated embodiments are described with particular reference to the gas and oil industry, one of skill in the art will recognize that the inventive concepts disclosed herein can relate equally to any form of pressurized line. Accordingly, the invention is not limited to the embodiments disclosed herein. Additionally, for purposes of this description, the terms "upper," "bottom," "right," "left," "front," "vertical," "horizontal," and derivatives thereof shall relate to the invention as oriented in FIG. 1.

Described herein is a novel approach to preventing the flow of material through a ruptured high pressure line by positioning a cap/blocking material at the source of the line flow (such as an oil reservoir, for example) which has a lower pressure than the rupture point of the broken line.

Figure 1:
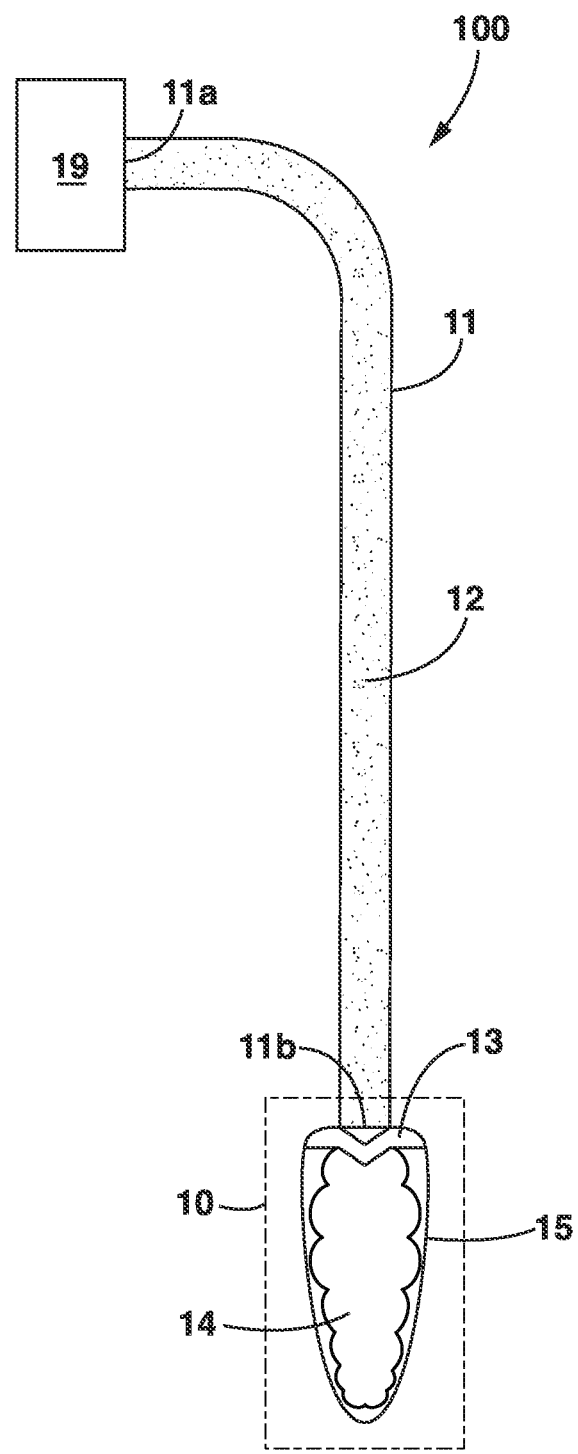
FIG. 1 is a perspective view of an expandable cap system that is useful for understanding the embodiments disclosed herein.

FIG. 1 illustrates one embodiment of an expandable cap system for preventing the flow of material through a high pressure line. As shown, system 100 can include a guide line 11 having a pump 19 at one end and a capping device 10 at the other end.

The guide line 11 can generally include a long tube having a first end 11a and a second end 11b capable of transporting supply material 12 under pressure to the expandable cap 10. In one embodiment, the guide line 11 can be constructed from an elongated piece of strong tubular material such as steel, aluminum alloy or composite materials, for example, having excellent resistance to internal and external pressures, extreme temperature variations, and tensile strength. It is preferred that the guide line 11 be able to flex within the natural curves and bends of underground piping, but be rigid enough to be forced against the flow of the pipe contents without bending or breaking, as will be described below.

Figure 2:
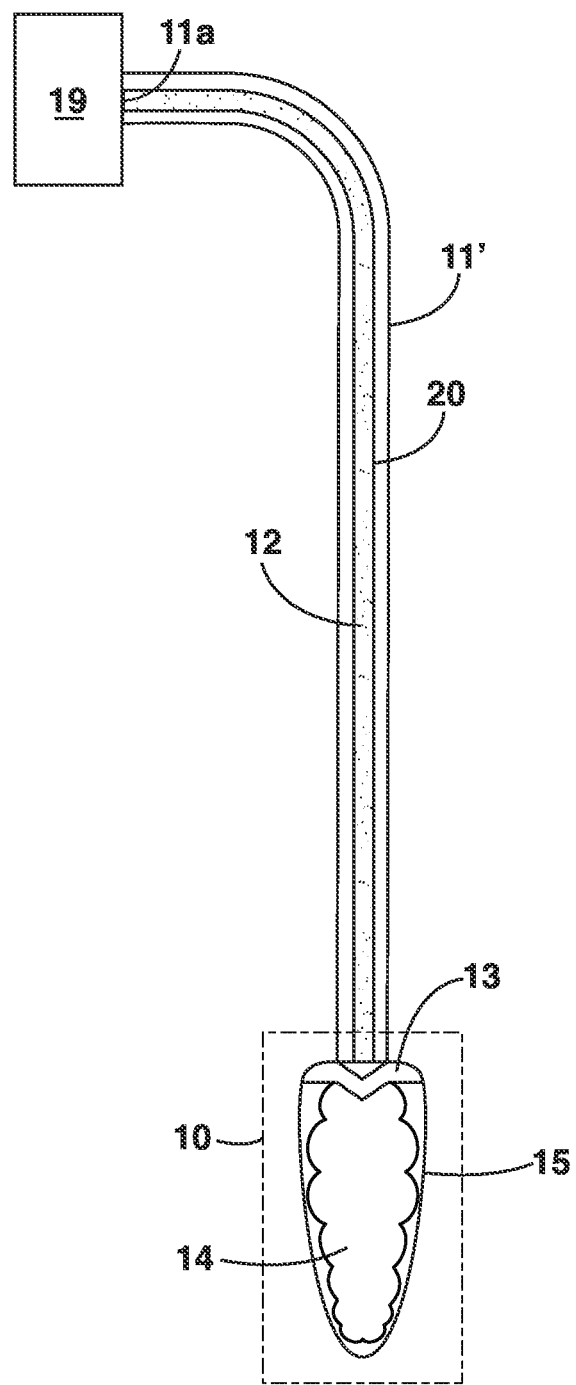
FIG. 2 is a perspective view of an expandable cap system in accordance with another embodiment of the present invention.

FIG. 2 illustrates an alternate embodiment of a guide line 11' that is constructed from composite or metallic elements wound into a spiral configuration similar to a spring or a conventional plumbing snake. When used in this configuration, the guide line 11' can become less rigid in order to flex within the bends and curves of pipes and high pressure lines. As shown, the guide line 11' can also include an inner tube 20 positioned within the center of the spiral guide line in order to provide the supply material 12 to the inflatable bladder 14. Of course, these are but two examples of guide lines that can be utilized with the present invention, and one of skill in the art will recognize that any number of other shapes, materials and configurations can also be utilized without departing from the scope and spirit of the invention.

Supply material 12 can act as a means for filling the inflatable bladder 14, and can therefore include any number of known materials capable of transferring pressure to another device. For example, supply material 12 can include, for example, water, hydraulic fluid, air, gas and oil among many other known materials. Additionally, supply material 12 can include additives such as antifreeze, for example, in order to allow the system to operate in extreme temperatures, and can also include any number of known fluids configured to change from a liquid state to a solid state under specified conditions.

The pump 19 can include any number of conventional pumps configured to receive fluid, gas or air from a source and push the same in a specified direction and at an adjustable pressure level. Pumps are extremely well known in the art and no further description will be provided herein.

Figure 3A:
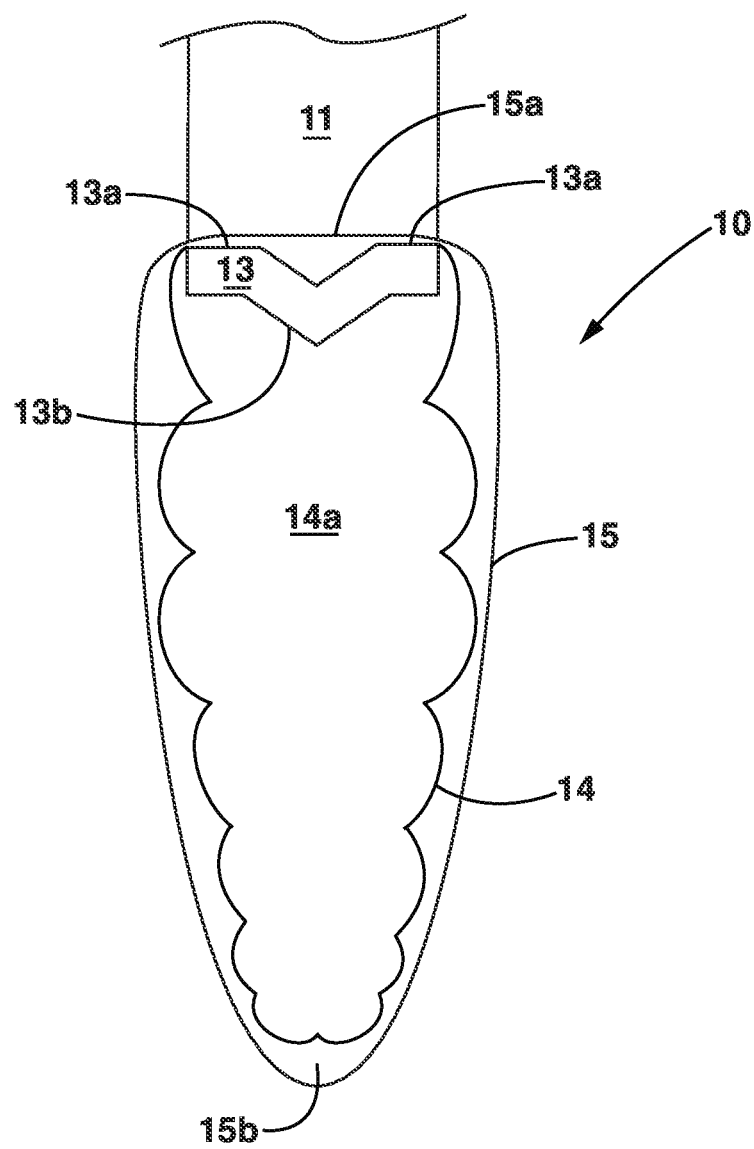
FIG. 3A is a front view of a capping device for use in the system in accordance with one embodiment of the present invention.

As shown in FIG. 3A, one embodiment of the capping device 10 can include a valve 13, an inflatable bladder 14 and a hollow hydrodynamic cone 15.

The valve 13 can be in communication with the inside of the guide line 11 and the inflatable bladder 14 so as to regulate the flow of the supply material 12 into and out of the inflatable bladder 14. In one preferred embodiment, valve 13 can include an in-line valve configured to receive a communication to open/close from a remotely located user in a conventional manner. Alternatively, the valve 13 can be configured to automatically open (i.e. allow the supply material 12 to enter the inflatable bladder 14) when the pressure of the supply material 12 exerted on the top of the valve 13a from the pump 19 exceeds a predetermined amount. As such, the valve can be self activating or remotely operated. Although described above as utilizing a specific valve, one of skill in the art will recognize that any number of conventional valves can be utilized herein. Pressure operated valves and valves of other types including their associated components and the controls for commanding valve operations are extremely well known in the art, therefore no further description will be provided.

The hydrodynamic cone 15 can be positioned at the end of the guide line 11 and can preferably cover the outside of the valve 13. As shown, the cone 15 can include a hollow interior into which the inflatable bladder 14 can be positioned when in a collapsed state. The streamlined shape of the hydrodynamic cone can act to smoothly divert fluid such as water, oil and other materials away from the device 10, thus significantly reducing drag. Such a feature can allow the device 10 to be inserted into a pipe or other high pressure line, and fed in a direction opposite to the flow of the high pressure line contents.

In one preferred embodiment, the top portion of the cone 15a can be sized approximate to the outside dimension of the valve 13 and/or the pipe 11 (if the valve is located within the line) so as to remain securely positioned/compressed over the outside of the valve 13. Additionally, when the device is in use, the upward force of the line contents impacting the nose portion of the cone 15b will act to further secure the valve 13 and cone 15 together, thus preventing a premature separation.

The inflatable bladder 14 can act in a substantially similar manner to a balloon or other such device having a shape that is capable of exponentially increasing when filled with another material. To this end, the top of the bladder 14 can be secured to the bottom of the valve 13b so as to allow the valve to deposit the supply material 12 into the inside of the bladder 14a. As shown in FIG. 3a, the inflatable bladder 14 can be initially positioned within the hollow cap 15 while in a collapsed state.

Next, as shown in FIG. 3B, when the supply material 12 is introduced into the inflatable bladder 14 via the valve 13, the inflatable bladder can begin to expand as illustrated by arrow A. As the inflatable bladder 14 expands, a downward pressure is exerted on the hydrodynamic cone causing it to separate from the valve 13 and be jettisoned (see arrow B).

As shown in FIG. 3C, as the inside portion of the inflatable bladder 14 becomes filled with the supply material 12, the bladder will expand to a shape having an outside dimension that is significantly larger than that of the guide line 11 and the pipe into which the device has been inserted. To this end, and as will be described below in detail, the inflated bladder will be unable to travel back through the pipe and will act as an obstruction for preventing the flow of material from entering the pipe at its source.

As described herein, an inflatable bladder can be constructed from any number of known expandable/collapsible materials including, for example, plastic, rubber, nylon, canvas or composite/composite blend materials among many others. Additionally, the bladder can be formed in any number of different shapes and sizes to suit a particular need.

In one alternate embodiment (not shown), inflatable bladder 14 can further include an optional metallic wire mesh secured to the outside of the bladder 14. Such a feature can act to provide additional strength and rigidity to the device 14.

Figure 4A:
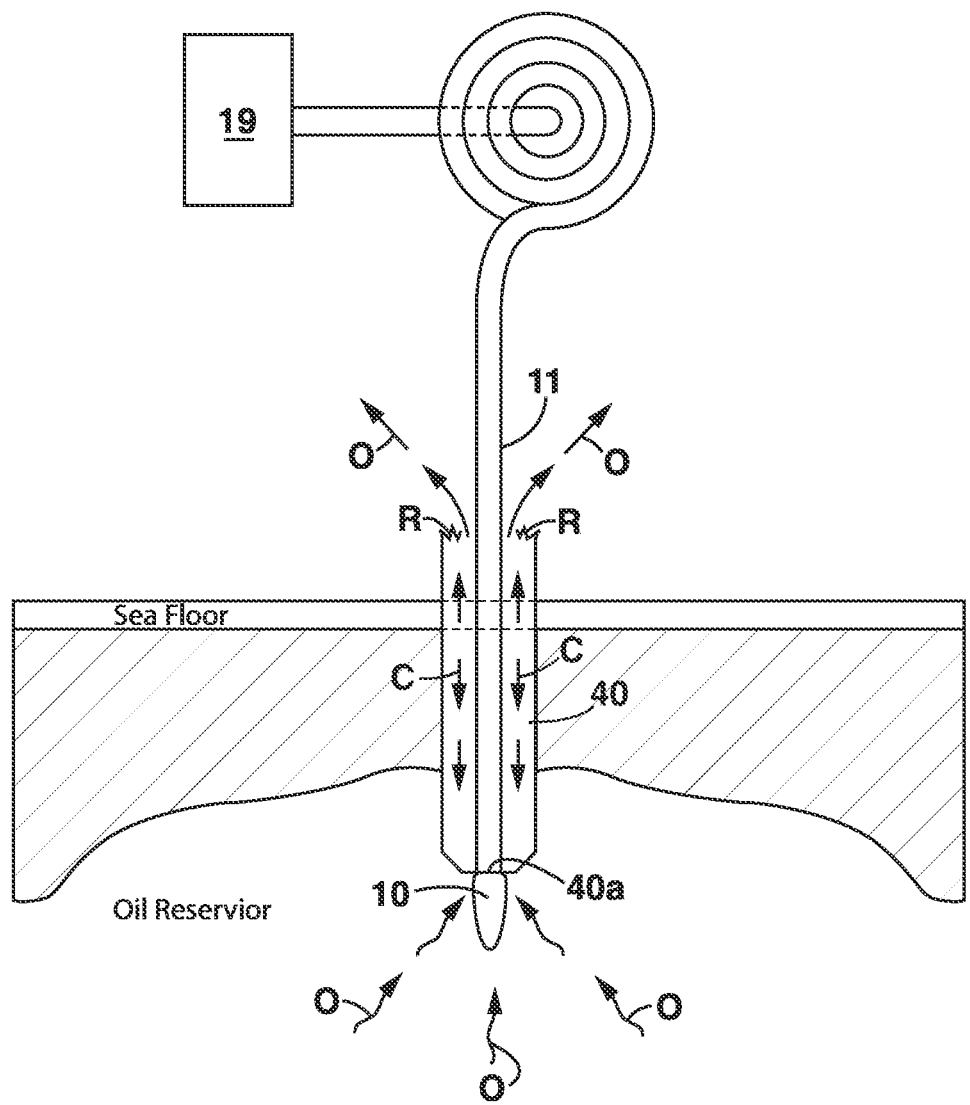
FIG. 4A is a perspective view of the expandable cap system in operation, according to one embodiment.
Figure 4B:
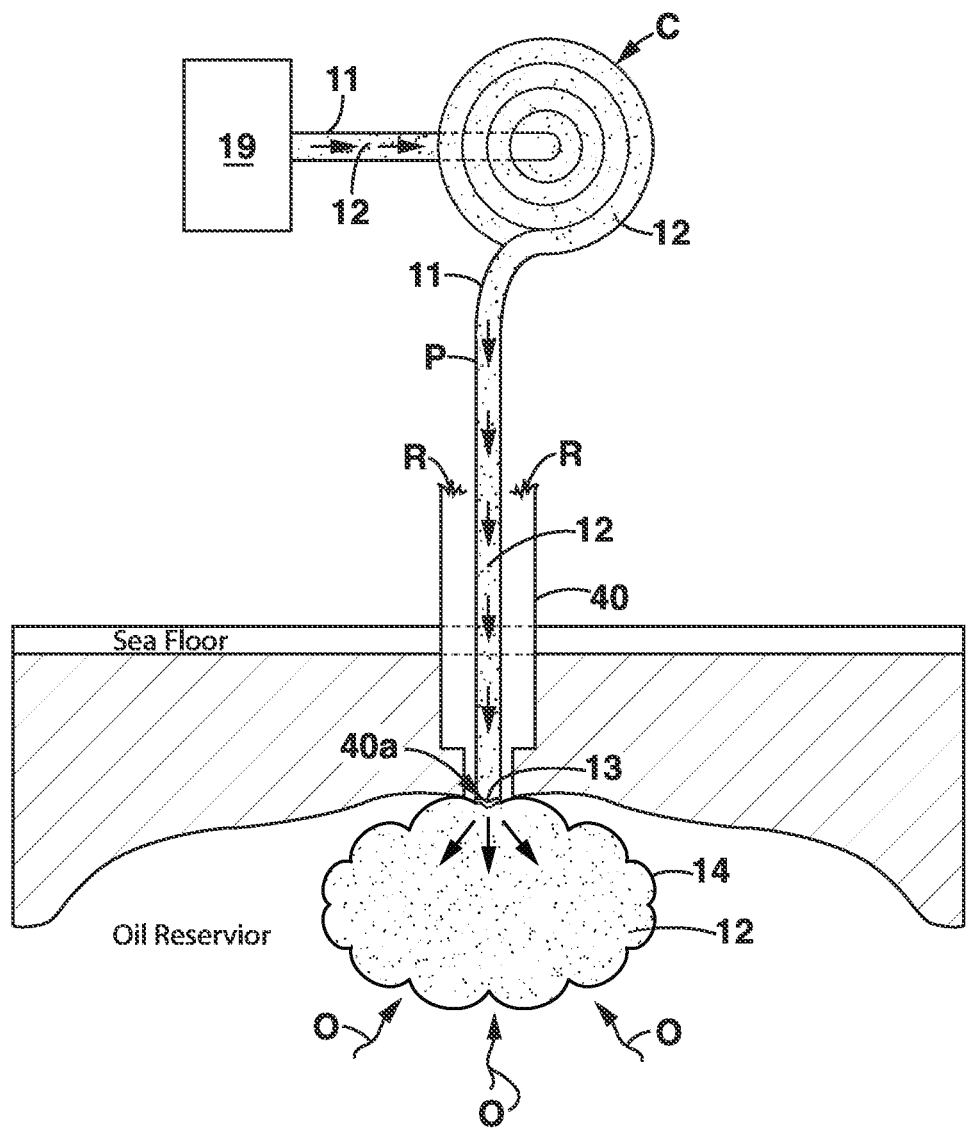
FIG. 4B is another perspective view of the expandable cap system in operation, according to one embodiment.

FIGS. 4A and 4B illustrate one embodiment of the system 100 in action. As illustrated herein, the system 100 is shown as capping an underwater oil line that has ruptured, however this is merely for illustrative purposes only as other uses and industries are also contemplated. Additionally, the guide line 11 must be extremely long in order to travel to the sea floor and the length of an undersea oil pipe, it is therefore preferable that the guide line be capable of being transported in a rolled/coiled position C as shown in the corresponding figures.

Owing to the fact that oil O located within an oil reservoir is at a substantially lower psi than oil flowing through a pipe 40, the system 100 can operate by positioning the capping device 10 in the lower pressure area of the reservoir before inflating the bladder 14, thereby capping the pipe from below. In operation, both the guide line 11 and the expanding cap 10 can include an outside dimension that is smaller than the inside dimension of the ruptured pipe 40. To this end, and as illustrated in FIG. 4A, the capping device 10 can be lowered into the oil pipe 40 at the rupture point R, and fed downward (see arrow C) against the flow of oil O. The cap 10 can continue to travel downward via the guide line 11 until exiting the bottom of the pipe 40a at the source of the oil (i.e., the oil reservoir). As methods and devices for feeding a line into/ through a pipe are well known to those of skill in the art, a detailed explanation of line delivery mechanisms will not be described herein.

As shown in FIG. 4B, when the capping device 10 exits the bottom of the pipe 40a, the pump 19 can force the supply material 12 into the bladder 14 at an adequate pressure (see arrow P) to cause the bladder to inflate and expand to a dimension that is greater than that of the oil pipe 40.

To this end, when in an inflated state, the bladder 14 will be pinned against the bottom of the pipe 40a due to the different pressures within pipe and the reservoir, thus creating a cap for preventing oil from entering the pipe and having a strength that works in conjunction with the environmental pressures. Stated differently, as the volume of oil within the oil line 40 decreases, the outside pressure exerted upon the inflatable bladder 14 by the oil inside the reservoir will act to secure the bladder 14 to the bottom of the oil pipe 40a, thus ensuring no oil enters the pipe.

Figure 5:
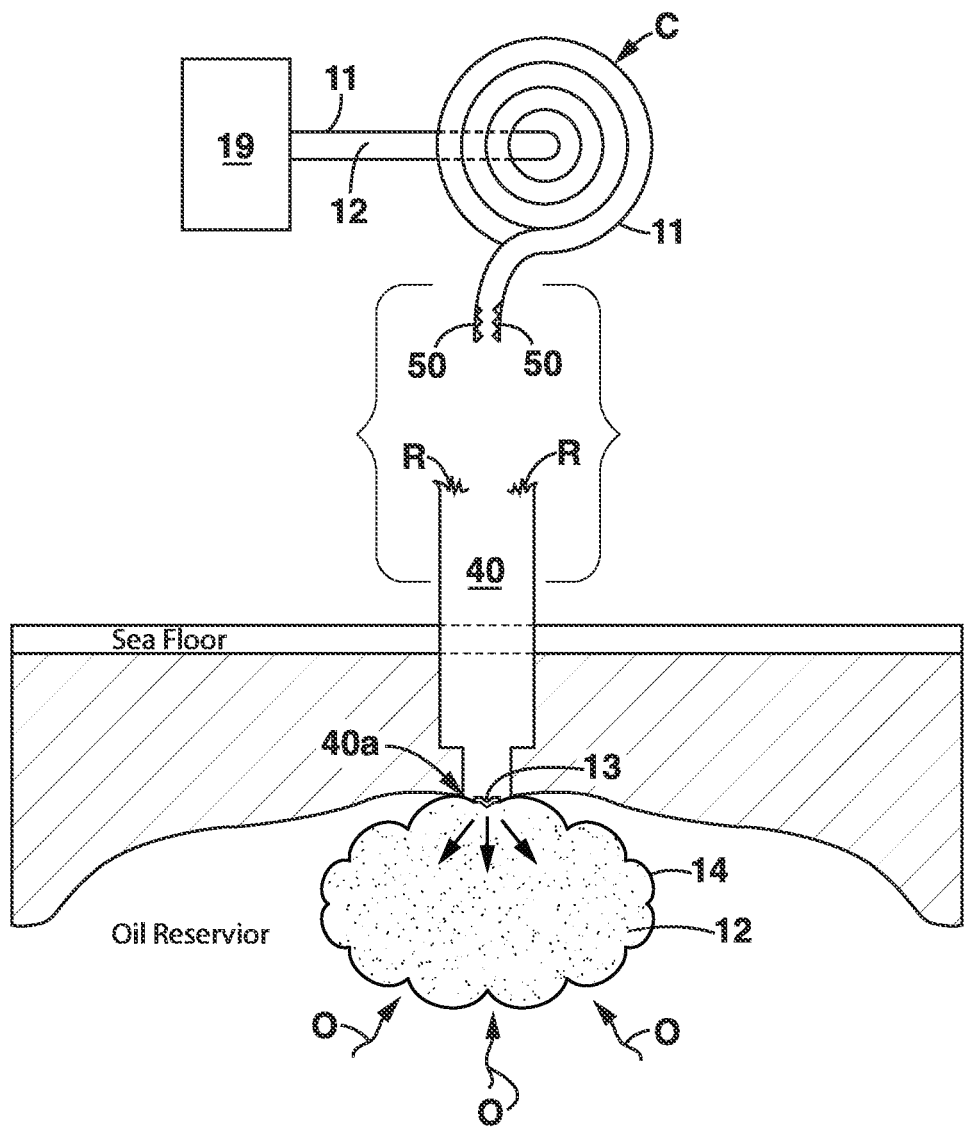
FIG. 5 is a perspective view of the expandable cap system in operation, according to an alternate embodiment.

FIG. 5 illustrates one alternate embodiment of a system 100 that further includes a connector 50 for separating the cap device from the guide line 11. To this end, the valve can be secured to the inside of the guide line via a connector 50 configured to provide a temporary connection point between the valve 13 and the guide line 11. The connector 50 can act to ensure the valve and seal remain connected while the system 100 is deployed through a ruptured valve and can then allow the line 11 to be separated from the valve 13 for retrieval after the bladder has been inflated.

In one embodiment, connector 50 can include a plurality of plastic tabs in communication with both the valve 13 and the guide line 11. To this end, when a predetermined amount of upward pressure is placed on the connector 50, (i.e. by retracting the supply line 11) the plastic tabs can break causing the valve 13 and the guide line 11 to separate, thus leaving the valve 13 and the inflated bladder 14 in the reservoir and allowing the guide line 11 to be retrieved and reused in the future.

In an alternate embodiment (not illustrated) the separation unit 50 can also include a remotely activated collar capable of expanding and retracting based on the commands of a user. Such a feature can allow a user to separate the valve 13 and guide line 11 at any desired time. In either case, by including a separation unit 50, the system 100 can position the inflatable bladder 14 in a desired area of a high pressure line (or a space below) and then remove the guide line 11, in order to have unobstructed access to the oil pipe 40 and the rupture point R. When used in the preceding example, such a feature can allow a user to repair a ruptured oil pipe 40 without having to battle the effects and pressure of the oil flow O emanating from the pipe.

Although described above as utilizing specific components, one of skill in the art will recognize that any number of devices can be utilized as the connector 50 in order to create a means for separating the valve and the guide line 11 in a controlled manner. Other embodiments can include, for example, magnets positioned on both elements, conventional compression fittings, and tack welds, among many others.

Figure 6:
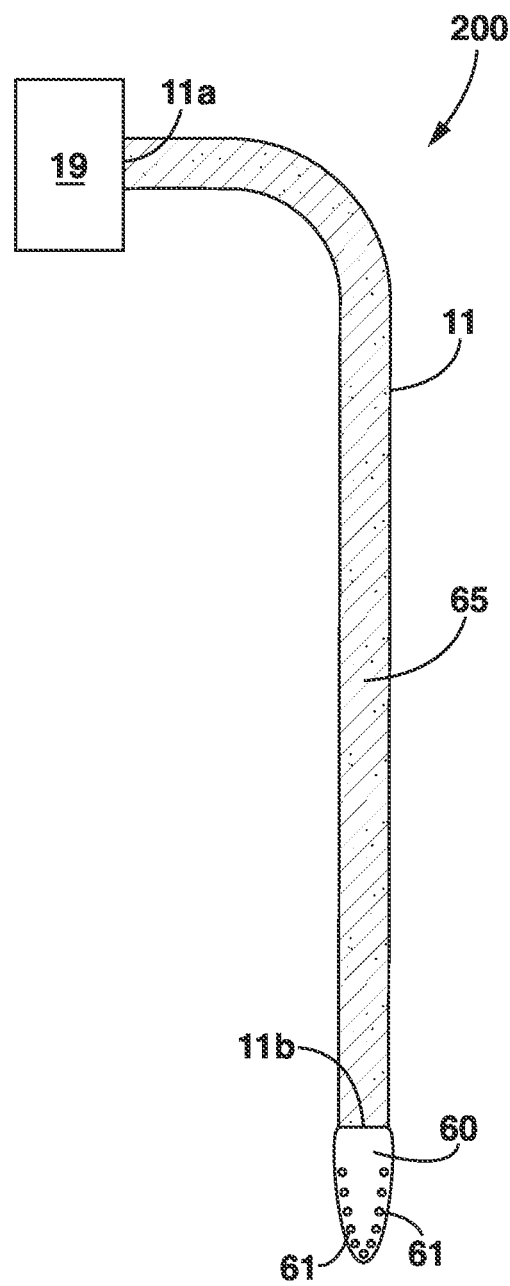
FIG. 6 is a perspective view of an expandable cap system in accordance with an alternate embodiment.

FIG. 6 illustrates an alternate embodiment of an expandable cap system that includes a self expanding material for capping a ruptured pipe. System 200, according to one embodiment, can include the pump 19 and guide line 11 described above, a self expanding material 65 and a nozzle 60.

The nozzle 60 can preferably include a hydrodynamic shape, as described above, that is permanently attached to the end of the guide line 11b in a conventional manner. Positioned along the exterior of the cone 60 are a plurality of one way openings 61 configured to allow a self expanding material 65 contained within the guide line 11 to be released into the outside environment.

The expanding material 65 (commonly referred to as "expanding foam") can perform substantially the same functionality as the bladder 14 described above when introduced into an outside environment such as an oil reservoir, for example. As described herein, self expanding material 65 and can include any number of known materials capable of being transported and pumped in a fluid, gas or slurry state, and then expanding to form a hardened solid material upon being released into an outside environment.

In one embodiment, the expanding material 65 can include a hydrophobic, polyurethane polymer, such as Icynene®, which combines an isocynate or isocyonine product and a poly-based resin along with carbon dioxide and heat to produce a foam with the ability to quickly expand and solidify in order to efficiently seal a leak. Known polyurethane polymer foams typically expand to full potential in 10-40 seconds allowing a quick solution to hazardous breaks in an oil rig. The foam can be further configured to cap a pipe by incorporating sub chemicals 65' such as, but not limited to, Thiokol® (a polyalkylene polysulfide), which contributes to the oil resistance of the foam polymer. Due to the pliable quality of polymers, the foam will remain resistant to the potential stretching and compressing of underwater atmospheres after it has hardened. The pliability, coupled with the temperature resistant nature of the polymer makes it a suitable permanent solution for curing rig leaks.

In another embodiment, the polyurethane polymer can be combined with a variety of chemical compounds that will result in the slow decomposition of the expanding material 65. By developing a measurable chemical half life for the expanding material 65, a high pressure line can be capped in the manner described above thus allowing repair crews adequate time to install a traditional cap or repair the ruptured area before the expanding material deteriorates and allows pipe contents to begin flowing again.

In another embodiment (not illustrated) the tip of the nozzle 60 can include a weighted material such as lead, for example, capable of allowing the nozzle to more easily pass through the ruptured pipe with the assistance of gravity. Alternatively, this weight can be located outside of the nozzle itself so as to not interfere with the function of the one way openings.

Figure 7:
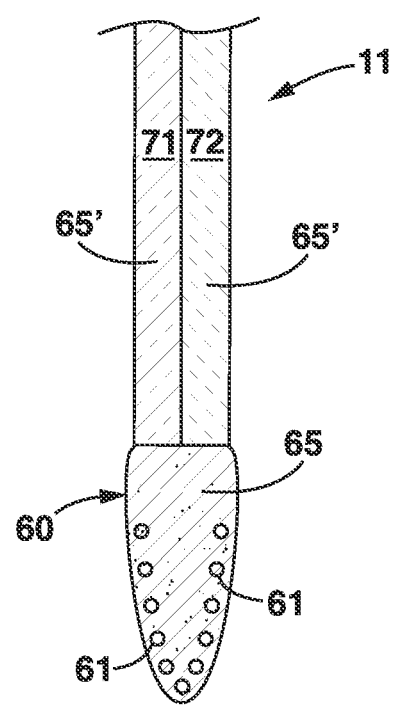
FIG. 7 is a perspective view of an expandable cap system in accordance with another alternate embodiment.

FIG. 7 illustrates an alternate embodiment of the system 200 in which the guide line 11 is segmented into two inner tubes 71 and 72. As shown, each of tubes 71 and 72 can contain different sub materials 65' which can be introduced together inside the nozzle 60, thus forming the expandable material 65 before being released into the outside environment via the openings 61. Stated differently, supply materials 65' can include two or more materials capable of transforming from a liquid to a solid when mixed together, thus forming the expanding material 65 described above.

FIG. 8 is a flow chart illustrating a method of preventing the flow of material through a high pressure line utilizing the system described above.

The method can begin at step 805 where a pipe or other such supply line is identified as containing a leak which must be capped. In step 810, the rupture point can be identified.

In step 815, the supply line 11 containing the cap device 10 or the nozzle 60 can be lowered to the pipe and inserted through the rupture point. In step 820, the supply line can be fed through the pipe until exiting from the pipe at the source of the content flow (such as an oil reservoir, for example).

In step 825, the supply material 12 or the expanding material 65 can be supplied to the pump 19 and fed through the supply line 11 at step 830.

In step 835, the supply material or expanding material can create a cap which blocks the flow of contents into the pipe, as described above, and in step 840, the supply line can be retrieved.

Accordingly, an expandable cap system for preventing the flow of material through a high pressure line, as described herein can allow a user to temporarily or permanently cap a high pressure pipe at the source of the flow which is at a lower pressure than the rupture point of the broken line.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for capping a high pressure line having a first end and a second end, said system comprising:
   a pump configured to move a supply material at a first pressure;
   an elongated semi-rigid supply hose functioning to transition between a coiled state and an uncoiled state, said hose being configured to transport the supply material; and
   a cap device configured to plug the second end of the high pressure line at a source of the high pressure line contents, said cap device including
      an inflatable bladder configured to receive the supply material,
      a valve in communication with the supply hose and the inflatable bladder, and
      a detachable hydrodynamic cone configured to house the valve and the inflatable bladder,
   wherein said supply hose functions to push the cap device into the first end of the high pressure line and through the second end of the high pressure line,
   each of said supply hose and cap device include an outside dimension that is less than an inside dimension of the high pressure line, and
   said bladder is configured to expand to a dimension that is greater than the inside dimension of the high pressure line.

2. The system of claim 1, wherein the supply hose is configured to flex while inside the high pressure line.

3. The system of claim 1, wherein the valve is configured to open when the first pressure exceeds a predetermined amount.

4. The system of claim 1, wherein the valve is configured to be remotely operated.

5. The system of claim 1, wherein the hydrodynamic cone is configured to be jettisoned when the bladder expands.

6. The system of claim 1, wherein the supply hose is constructed from at least one of steel, aluminum alloy and composite materials.

7. The system of claim 1, wherein the supply hose is constructed from an elongated spiral member having an inner tube positioned within a center portion thereof, said spiral member being configured to flex when inserted into the high pressure line, and said inner tube being configured to transport the supply material to the valve of the cap device.

8. The system of claim 1, wherein the supply material includes at least one of water, air and hydraulic fluid having an antifreeze additive.

9. The system of claim 1, wherein the inflatable bladder is constructed from at least one of plastic, rubber, nylon, canvas and composite materials.

10. The system of claim 1, wherein the bladder further includes an expanding wire mesh secured to an outside portion thereof.

11. The system of claim 1, wherein the valve is removably connected to the supply hose.

12. A method of capping a high pressure line having a first end and a second end, said method comprising:
   locating the first end of the high pressure line;
   transitioning a portion of an elongated semi-rigid supply hose from a coiled state to an uncoiled state;
   pushing a probe that is connected to one end of the supply hose via the supply hose into the first end of the high pressure line;
   traversing the probe through the high pressure line;
   exiting the probe from the second end of the high pressure line, said second end being located at a source of the high pressure line contents;
   providing a supply material to the probe;
   creating a physical barrier at the second end of the high pressure line, said barrier being configured to prevent the line contents from entering the high pressure line,
   wherein said probe includes a cap device having an inflatable bladder configured to receive the supply material,
   a valve that is in communication with the supply hose and the inflatable bladder, and
   a detachable hydrodynamic cone configured to house the valve and the inflatable bladder.

13. The method of capping a high pressure line of claim 12, further comprising:
   retrieving the supply hose.

* * * * *